3,352,858
ANTIBACTERIAL AGENTS OF THE
CEPHALOSPORIN CLASS
Leonard Bruce Crast, Jr., North Syracuse, and John Michael Essery, Liverpool, N.Y., assignors to Bristol-Myers Company, New York, N.Y., a corporation of Delaware
No Drawing. Filed Apr. 7, 1966, Ser. No. 540,835
8 Claims. (Cl. 260—243)

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and especially Salmonella and, more particularly, relates to 7 - [α - amino-α-(2-thienyl)acetamido)-cephalosporanic acid and related salts and derivatives.

Antibacterial agents of the cephalosporin class have proven highly effective in the therapy of infections due to either Gram-positive or Gram-negative bacteria but few are effective against both, very few are effective in concentrations below 1.0 mcg./ml. and none are very effective in practical use against infections caused by Salmonella, e.g., *S. enteritidis*. It was the object of the present invention to provide novel compounds effective against both Gram-positive and Gram-negative bacteria including the resistant strains. It was a further object of the present invention to provide cephalosporins active against Gram-positive and Gram-negative bacteria which are also efficiently absorbed upon oral administration to man and animals.

The objects of the present invention have been achieved by the provision, according to the present invention of the compounds of the formula (I)
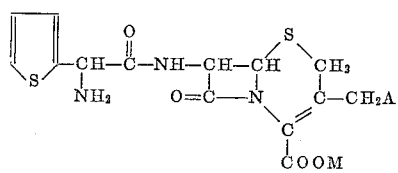

wherein A is hydrogen, hydroxyl, (lower)alkanoyloxy containing 2–8 carbon atoms, e.g., acetoxy, propionoyloxy, butanoyloxy, pentanoyloxy, etc., benzoyloxy, a quaternary ammonium radical, e.g., pyridinium, quinolinium, picolinium, lutidinium, or, when taken together with M, a monovalent carbon-oxygen bond; and
M is hydrogen, a pharmaceutically acceptable nontoxic cation, an anionic charge when A is a quaternary ammonium radical, or, when taken together with A, a monovalent carbon-oxygen bond.

For clarity, we have illustrated below the formulae of the compounds when, in Formula I, A is a quarternary ammonium radical (pyridinium) and M is an anionic charge and when A and M together are a monovalent carbon-oxygen bond.

(II)
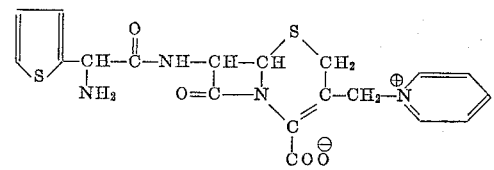

(III)
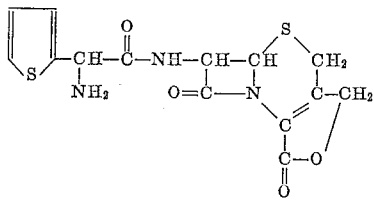

The preferred embodiments of the present invention are the free acids and salts thereof of which the free acids have the formulae (IV)
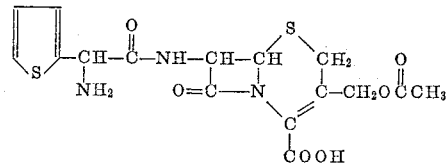

and (V)
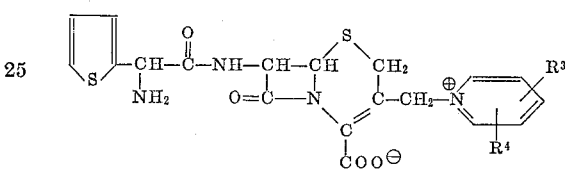

The pharmaceutically-acceptable, nontoxic cations include metallic cations such as sodium, potassium, calcium and aluminum and organic amine cations such as trialkylamines, e.g., triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N - (lower)alkylpiperidines, e.g., N-ethylpiperidine, and other amines which have been used to form salts with benzylpenicillin.

The products of the present invention are prepared in the form in which the α-amino group is blocked by the reaction of a compound of the formula (VI)

$$H_2N-CH-CH \begin{array}{c} S \\ \diagup \diagdown \\ \end{array} CH_2$$
$$O=C-N \diagdown \diagup C-CH_2A$$
$$\phantom{O=C-N \diagdown \diagup} C$$
$$\phantom{O=C-N \diagdown \diagup} COOM$$

wherein A and M are described above (preferably in the form of a neutral salt such as the sodium salt or the triethylamine salt, i.e., when A is hydrogen, hydroxy, (lower)alkanoyloxy or benzoyloxy) with an active ester, e.g., 2,4-dinitrophenyl ester, p-nitrophenyl ester or N-hydroxysuccinimide ester, of an acid having the formula

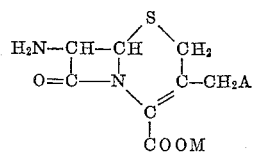

or the formula

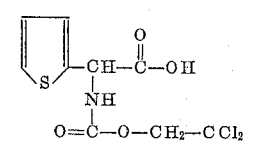

or with its functional equivalent as an acylating agent for a primary amino group. Such equivalents include the corresponding carboxylic chloride, bromides, acid anhydrides, including mixed anhydrides and particularly the mixed anhydrides prepared from stronger acids such as the lower aliphatic monoesters of carbonic acid, of alkyl and aryl sulfonic acid and of more hindered acids such as diphenylacetic acid. In addition, an acid azide or an active ester or thioester (e.g., with p-nitro-phenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African Patent specification 63/2,684] of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidizolide isolated, but this is not essential. The methods for carrying out these reactions to produce a cephalosporin and the methods used to isolate the cephalosporin so-produced are well-known in the art (cf. U.S. Patent Nos. 3,079,314, 3,117,126 and 3,129,224 and British Patent Nos. 932,644, 957,570 and 959,054).

The blocking group is then removed to form the products of the present invention, e.g., the carbobenzyloxy group is removed by catalytic hydrogenation and the trichloroethoxycarbonyl group by treatment with zinc dust in glacial acetic acid.

The compounds of Formula VI used in the present invention include 7-aminocephalosporanic acid and derivatives of 7-aminocephalosporanic acid. 7-aminocephalosporanic acid is prepared by hydrolysis of cephalosporin C and has the formula

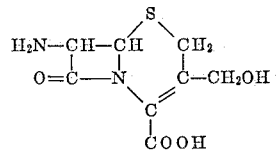

Acid hydrolysis of cephalosporin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula

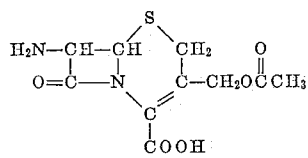

Enzymatic hydrolysis of the acetoxy group of 7-aminocephalosporanic acid results in the formation of 3-hydroxymethyl - 7 - aminodecephalosporanic acid having the formula

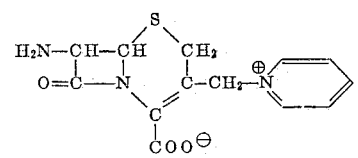

and such compounds may be re-esterified with benzoic acid or a lower alkanoic acid, e.g., acetic acid, propionic acid and the like to form other esters. Preferably, re-esterification is carried out on a 3-hydroxymethyl-7-(α-amino - α - 2-thienyl - acetamido)-decephalosporanic acid which is obtained by enzymatic hydrolysis of a 7-(α-amino-α-2-thienyl-acetamido)cephalosporanic acid.

Treatment of cephalosporin C with a tertiary amine, e.g., pyridine, lutidines, picolines and the like, followed by acid hydrolysis produces a nucleus which, in the case of pyridine, has the formula

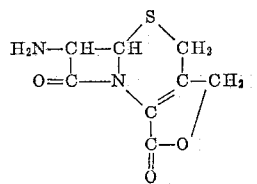

and has been given the name 3-pyridiniummethyl-7-aminodecephalosporanic acid inner salt.

The foregoing nuclei and the preparation thereof are known in the art and are described for example in U.S. Patent No. 3,117,126 and British Patent Nos. 932,644, 957,570 and 959,054.

3-methyl-7-aminodecephalosporanic acid having the formula

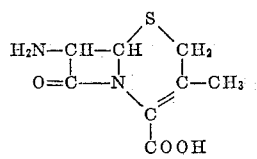

is produced by catalytic reduction of cephalosporin C followed by hydrolytic removal of the 5-aminoadipoyl side chain as described in U.S. Patent No. 3,129,224.

In these compounds the carbon bearing the free amino group is an asymmetric carbon atom and thus the reagents and final products can exist in two optically active, isomeric forms (the D- and L-diastereoisomers) as well as in a mixture of the two optically active forms, all of which are included in the present invention.

*Starting reagents*

α-(2-thienyl)-glycine is prepared according to Ber. 19, 2115 (1886). (—)-α-(2-thienyl)glycine and (—)-α-carbobenzoxyamino-α-(2-thienyl)acetic acid are also prepared in the following manner:

A mixture of 25 grams. (0.157 mole) of d,l-α-amino(2-thienyl)acetic acid and 43.6 gms. (0.188 mole) of d-10-camphorsulfonic acid and 250 ml. of acetone is heated to boiling to bring the solids into solution. The hot solution is filtered to remove any insoluble material, and the filtrate is cooled in an ice bath. The resulting crystalline precipitate is recovered by filtration, washed with acetone, and air-dried to give 27.2 gms. of the diastereoisomeric camphor sulfonate salt of the amino acid. This salt is suspended in a small amount of water, the pH is adjusted to 6.3 with concentrated NH₄OH, and the mixture is cooled in an ice bath. The crystalline product, (—)-α-amino(2-thienyl)acetic acid, is recovered by filtration, washed with water and acetone, recrystallized twice from isopropanol, and air-dried. It is found to weigh 4.5 gms., to melt with decomposition at 189–191° C., and to have an optical rotation of $[\alpha]_D^{23} = -73.7°$ (C=1.0% in water).

(—)-α-amino(2-thienyl)acetic acid 10 gms.; 0.063 mole) is dissolved in 75 mls. of water at 5° C. Carbobenzoxy chloride (12 gms.; 0.07 mole) is added, the mixture is stirred and a solution of NaOH (5.0 gms.) in 30 mls. of water is added. The mixture, which has a pH of 5, is stirred for 25 minutes, extracted twice with ether and acidified to pH 2 by the addition of H₂SO₄. The acid is then extracted with ether and the extract is washed with water and dried over magnesium sulfate to give a clear solution. The ether is evaporated and an oil is obtained which is slurried with Skellysolve B. Crystals are thereby formed which are collected by filtration. The product, (—)-α-carbobenzoxyamino-α-(2-thienyl)acetic acid (13 gms.), is dried overnight in vacuo over P₂O₅. The product is determined to have a melting point of 85–86° C.

α-(2,2,2-trichloroethoxycarbonylamino)-α-(2-thienyl) acetic acid is prepared as illustrated below in the examples from α-(2-thienyl)glycine and 2,2,2-trichloroethyl chloroformate.

The following examples will serve to illustrate this invention without limiting it thereto.

EXAMPLE 1

*N - carbobenzoxy - 2 - thienylglycine.*—33.0 gms. (0.21 mole) of D-(—)-2-thienylglycine were dissolved in a solution of 16.4 gms. (0.41 mole) of sodium hydroxide and 225 ml. water. The resulting solution was cooled to 0° C. with stirring and 39.5 gms. (0.23 mole) of carbobenzoxy chloride were added at 0° C. The reaction was stirred for 1 hour at 0° and, then, for 1 hour at 0–10°. The solution was extracted with 1×200 ml. diethyl ether. The aqueous solution was acidified with concentrated hydrochloric acid and extracted with 2×300 ml. ethyl acetate. The ethyl acetate extracts were combined, dried briefly with MgSO₄, and filtered. The solvent was removed at reduced pressure to give after dilution with lower alkanes ("Skellysolve B") 44.2 gms. (72.4%) of crystalline N-carbobenzoxy-2-thienylglycine, M.P. 79–81°. The infrared spectrum of this material showed absorption attributed to amide NH, 3300 cm.⁻¹; acid $\underset{\text{O}}{\overset{\|}{\text{C}}}$, 1740; carbamate $\underset{\text{O}}{\overset{\|}{\text{C}}}$ and amide $\underset{\text{O}}{\overset{\|}{\text{C}}}$ 1670–1600 cm.⁻¹; amide NH deformation and aromatic, 1540 cm.⁻¹ 713 mono-substituted phenyl absorption

*7 - [D(—) - α - carbobenzoxyaminothienyl - 2' - acetamido]cephalosporanic acid.*—To a stirred solution of 17.49 g. (0.06 mole) N-carbobenzoxy-2-thienylglycine, 8.4 ml. (0.06 mole) triethylamine and 300 ml. tetrahydrofuran, 6.13 ml. (0.06 mole) of trimethylacetyl chloride was added at 0°. After 10 min., a solution of 16.32 g. (0.06 mole) 7-aminocephalosporanic acid, 16.8 ml. (0.12 mole) triethylamine, 150 ml. tetrahydrofuran and 150 ml. water was added. The reaction mixture was stirred at 0° for 30 min., at 0–10° for 1 hr., and, then, diluted with 200 ml. H₂O. The tetrahydrofuran was evaporated with the use of a rotary evaporator giving a thick syrup which was shaken with 400 ml. ethyl acetate. 17 ml. of 42% H₃PO₄ was added and the product extracted into the ethyl acetate. The aqueous solution was extracted with an additional 200 ml. ethyl acetate. The ethyl acetate extracts were combined, dried briefly with sodium sulfate and filtered. The ethyl acetate was concentrated to give after dilution with lower alkanes ("Skellysolve B") 12.1 g. (38%) of crystalline 7 - [D(—) - α - carbobenzoxyamino-thienyl-2'-acetamido]-cephalosporanic acid. It was characterized by its infrared spectrum:

amide NH, 3300 cm.⁻¹; carboxyl OH and absorbed H₂O 2800–3500 cm.⁻¹; β-lactam $\underset{\text{O}}{\overset{\|}{\text{C}}}$, 1780 cm.⁻¹; 1690–1750 cm.⁻¹, ester $\underset{\text{O}}{\overset{\|}{\text{C}}}$ carboxyl $\underset{\text{O}}{\overset{\|}{\text{C}}}$, amide $\underset{\text{O}}{\overset{\|}{\text{C}}}$, carbamate $\underset{\text{O}}{\overset{\|}{\text{C}}}$ amide and carbamate NH deformation, 1525 cm.⁻¹; ester carbamate 1230 cm.⁻¹; monosubstituted phenyl absorption, 707 cm.⁻¹

*Analysis.*—Calcd. for C₂₄H₂₃N₃O₈S₂: C, 52.84; H, 4.25. Found: C, 52.20; H, 4.30.

*7 - [D(—) - α - aminothienyl - 2' - acetamido]cephalosporanic acid.*—The 7 - [D(—)-α-carbobenzoxyamino-thienyl-2'-acetamido]cephalosporanic acid (12.0 g.) was hydrogenated in four batches, each containing a solution of 3.0 g. (0.00549 mole) of this material, 30 ml. 1,4-dioxane, 10 ml. of a saturated sodium bicarbonate solution, 165 ml. of water in the presence of 3.0 g. of 30% palladium or diatomaceous earth in a Parr hydrogenation apparatus at an intial pressure of 48 pounds per square inch for exactly 5.0 min. The reaction mixture was acidified to pH 2.0 with 6 N hydrochloric acid, and the catalyst was filtered on a bed of diatomaceous earth ("Hydro-flo Supercel"). The filtrate was adjusted to pH 3.6 with a saturated solution of sodium bicarbonate, and diluted with an equal volume of n-butanol. The solution was concentrated at 33° at reduced pressure to approximately 10 ml. The product was collected to give 6.0 g., containing 45% NaCl. The filtrate was diluted with diethyl ether to give an additional 0.5 g. of crystalline product as the zwitter-ion. The total yield of products as the amino acid is 3.5 g. (44%). The zwitter-ion was characterized by its infrared spectrum:

amide NH, and (strong, broad) NH₃⁺, 3600–2400 cm.⁻¹ β-lactam and acetate $\underset{\text{O}}{\overset{\|}{\text{C}}}$, 1760 cm.⁻¹; amide $\underset{\text{O}}{\overset{\|}{\text{C}}}$, 1690 cm.⁻¹ carboxylate, 1600 and 1400 cm.⁻¹

The compound prepared above exhibited in vitro Minimum Inhibitory Concentrations versus *S. aureus* Smith of about 1.2–2.5 mcg./ml., versus the benzylpenicillin-resistant *S. aureus* BX-1633-2 of about 1.6–3.1 mcg./ml., versus *S. enteritidis* of about 6.2 mcg./ml., versus *S. typhosa* of about 12.5 mcg./ml. and versus *Shig. sonnei* of about 6.2 mcg./ml.

*7 - [2'2' - dimethyl - 5' - oxo - 4' - (2'' - thienyl) - 1'-imidazolidinyl]cephalosporanic acid.*—A solution containing 4.0 g. (45% sodium chloride; 0.0056 mole) of 7-[D(—) - α - aminothienyl-2'-acetamido]cephalosporanic acid, 0.77 ml. triethylamine, and 70 ml. acetone was stirred for 15 hours at 22°. The insoluble salt was filtered, and the filtrate was evaporated on a rotary evaporator to give a brittle foam of the triethylammonium salt. The foam was dissolved in 17 ml. of H₂O, acidified to pH 2.4 with 42% H₃PO₄, and quickly extracted with 75 ml. of ethyl acetate. The aqueous solution was again extracted with 50 ml. of ethyl acetate. The ethyl acetate extracts were combined, dried briefly with Na₂SO₄ and evaporated to dryness to give 63 mg. (3%) of crystalline 7 - [2',2' - dimethyl - 5' - oxo - 4' - (2''-thienyl)-1'-amida-zolidinyl]cephalosporanic acid after washing with anhydrous diethyl ether. The infrared spectrum of this material showed absorption attributed to:

NH and absorbed H₂O, 3400 cm.⁻¹ (broad); acid OH, 2800–2700 cm.⁻¹ β-lactam $\underset{\text{O}}{\overset{\|}{\text{C}}}$, 1780 cm.⁻¹; acetate $\underset{\text{O}}{\overset{\|}{\text{C}}}$ and acid $\underset{\text{O}}{\overset{\|}{\text{C}}}$, 1720 cm.⁻¹ (broad)

The compound prepared above exhibited in vitro Minimum Inhibitory Concentrations versus *S. aureus* Smith of about 2.5 mcg./ml., versus the benzylpenicillin-resistant *S. aureus* BX–1633-2 of about 1.6 mcg./ml., versus *S. enteritidis* of about 1.6 mcg./ml., versus *S. typhosa* of about 6.2 mcg./ml. and versus *Shig. sonnei* of about 6.2 mcg./ml.

EXAMPLE 2

*2,2,2-trichloroethyl chloroformate* [*Ref.: German Pat. 358,125; C.A. 17, P2172c*].—To a stirred and cooled solution of 74.7 g. (0.5 mole) of 2,2,2-trichloroethanol (Aldrich Chemical Co.), 64.58 g. (0.5 mole) of quinoline (Eastman Organic Chemicals, synthetic grade) in 1,000 ml. of benzene [1] at 8° C., was added a solution of 49.46 g. (0.5 mole) of phosgene in 500 ml. of benzene [1] over a one-hour period. The resulting thick slurry was stirred at 6° to 10° C. for one hour and then two hours with the ice bath removed. The slurry was then filtered and the cake of quinoline hydrochloride washed with two 250 ml. portions of benzene. The combined filtrates were concentrated in vacuo to an oil at a temperature not exceeding 60° C. The oil was then filtered under a nitrogen atmosphere through glass wool and weighed 95 g. (90%). The infrared spectrum was consistent with the desired structure showing the

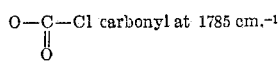

O—C—Cl carbonyl at 1785 cm.⁻¹

*D-(—)-α-(2,2,2 - trichloroethoxycarbonylamino)-α-(2-thienyl)-acetic acid.*—To an ice cold (5° C.) stirred solution of 8 g. (0.2 mole) of NaOH in 200 ml. of water, was added 15.7 g. (0.1 mole) of D-(—)-α-amino-α-(2-thienyl)-acetic acid and when solution had been obtained 21.2 g. (0.1 mole) of 2,2,2-trichloroethyl chloroformate in 50 ml. of $CH_2Cl_2$ was added all at once with vigorous stirring. After 30 minutes the ice bath was removed and the vigorous stirring continued for one hour. The $CH_2Cl_2$ layer was separated and discarded and a second 100 ml. $CH_2Cl_2$ extract taken and discarded. The aqueous phase was then cooled, stirred, layered with 100 ml. of $CH_2Cl_2$ and acidified to pH 2 with 40% $H_3PO_4$. The $CH_2Cl_2$ layer was separated and combined with a second $CH_2Cl_2$ (100 ml.) extract and then washed once with 100 ml. of water. The $CH_2Cl_2$ layer was then filtered through anhydrous $Na_2SO_4$ and the $Na_2SO_4$ washed with three 25 ml. portions of $CH_2Cl_2$. The combined filtrate and washings were concentrated in vacuo to an oil which crystallized slowly. Recrystallization from benzene gave 14.4 g., M.P. 147–149° C. and a second crop 7 g., M.P. 130–133° C. which was less pure. The combined yield was 64% of theory. $[\alpha]_D^{25°C.} = -80.45°$ (1st crop) C=1% in 95% ethanol

*Analysis.*—Calcd. for $C_9H_8Cl_3NO_4S$: C, 32.53; H, 2.43. Found: C, 33.38, 33.21; H, 2.63, 2.52.

*Sodium D-(—)-7-[α - (2-thienyl)-α-(trichloroethoxycarbonylamino) - acetamido] - cephalosporanate.*—To a stirred, —10° C. solution of 8.3 g. (0.025 mole) of D-(—)-α-(2,2,2-trichloroethoxycarbonylamino) - α - (2-thienyl)-acetic acid, 3.5 ml. (0.025 mole) of triethylamine (TEA) and 50 ml. of tetrahydrofuran (THF) was added 3.03 g. (0.025 mole) of pivalyl chloride (Aldrich Chemical Co.) all at once. Fifteen minutes later an ice cold solution of 6.8 g. (0.025 mole) of 7-ACA, 7 ml. (0.050 mole) of TEA, 25 ml. of THF and 25 ml. of water was added all at once with vigorous stirring. The temperature was kept at or below 0° C. for 30 minutes and then the ice-salt-acetone bath was removed and stirring continued for one hour. The THF was then removed in vacuo at 20° C. and the remaining solution diluted with 50 ml. of water. Two 75 ml. ether extracts were taken and discarded. The aqueous solution was then layered with 100 ml. of ethyl acetate and cooled and stirred while being acidified to pH 2 with 40% phosphoric acid. The ethyl acetate extract was than combined with a second 100 ml. ethyl acetate extract and washed two times with 100 ml. of water and once with a 100 ml. portion of saturated NaCl solution. The extracts were then dried 10 minutes over $Na_2SO_4$, filtered and the $Na_2SO_4$ washed with three 25 ml. portions of ethyl acetate. The combined filtrates were then treated with 8.5 ml. (0.025 mole) of NaEH (sodium 2-ethylhexanoate in n-butanol; 3.4 ml.=0.01 mole). Approximately half of the ethyl acetate was then removed in vacuo at 20° C. when crystallization began. There was obtained 8.1 g. of crystalline sodium D-(—)-7-[α-(2-thienyl)-α-(trichloroethoxy-carbonylamino) - acetamido] - cephalosporanate decomposing at 170–172° C. with darkening above 130° C. The infrared and NMR spectra were entirely consistent with the desired structure.

*Analysis.*—Calcd. for $C_{19}H_{17}Cl_3N_3O_8S_2 \cdot Na$: C, 37.47; H, 2.81. Found: C, 39.22, 38.97; H, 2.91, 3.28.

*Sodium D-(—)-7-[α-amino-α-(2-thienyl) - acetamido]-cephalosporanate.*—To a stirred solution of 3.04 g. (0.005 mole) of sodium 7-[α-(2-thienyl)-α-(trichloroethoxycarbonylamino)-acetamido]-cephalosporanate in 27 ml. of glacial acetic acid and 3 ml. of water at 0° C., was added all at once 10 g. of Zn dust and stirring continued for two and a half hours. The slurry was then filtered and the cake washed with 25 ml. of 1:1 by volume acetic acid-water and finally with 15 ml. of water. The combined filtrates were concentrated to an oil under reduced pressure at 20° C. Twenty-five ml. of water was then added and the resulting solution acidified to pH 2 with 40% $H_3PO_4$. At this point some crystalline material (presumably Zn salts) crystallized out and was filtered off, washed with a little water and the combined filtrates treated with solid $NaHCO_3$ until pH 4.5 was reached. More crystalline material precipitated. The slurry was filtered again, the cake washed with a little water and the combined filtrate concentrated in vacuo at 20° C. to dryness. The residues were triturated with dry ether and the resulting solids filtered off. The air dried material weighed 2.5 g. and was then slurried in 150 ml. of $CH_2Cl_2$ and 1.4 ml. of TEA. After three minutes stirring the inorganic salts were filtered off and the filtrate concentrated under reduced pressure to a small volume after *first* being treated with 2 ml. of 50% NaEH (sodium 2-ethylhexanoate in n-butanol). At this point the sodium D-(—)-7-[α-amino-α-(2-thienyl)-acetamido] - cephalosporanate crystallized and was collected by filtration, washed with ethyl acetate and air dried. After drying 18 hours at 0.1 mm. Hg over $P_2O_5$ there was obtained 400 mg., dec. at 188° C. with darkening above 130° C. The IR and NMR spectra were entirely consistent with the desired structure.

EXAMPLE 3

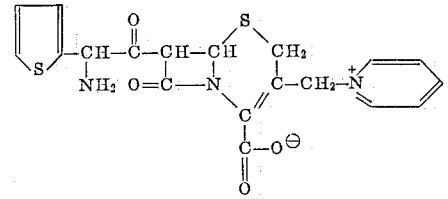

3-pyridiniummethyl - 7 - aminodecephalosporanic acid inner salt (1.5 g.) is shaken with methylene chloride at room temperature until the mixture becomes homogeneous and this solution is used in place of the 7-aminocephalosporanic acid solution in the procedure of Example 2 to prepare 3 - pyridiniummethyl - 7 - [α-amino-α-(2'-thienyl)acetamido]decephalosporanic acid inner salt. This product is sensitive to light so that it is advisable to protect it from light as much as practical during its manufacture and subsequent processing and packaging.

EXAMPLE 4

Pyridine (10 ml.) is added with stirring to a mixture of water (50 ml.) and 7-[α-amino-α-(2'-thienyl)acetamido]-cephalosporanic acid (5 g.) to form a solution which is left under nitrogen at about 45° C. for twelve hours and then extracted four times with 20 ml. methylene chloride. The aqueous phase is concentrated in vacuo at about 30° C. and then passed through a column containing a strongly basic, anion exchange resin of the quaternary ammonium type (e.g., "Dowex 1") in the ---
[1] The benzene was redistilled to eliminate most of the water.

acetate cycle. The eluates containing the desired pyridine derivative as judged polarimetrically are combined, lyophilized and triturated in methanol to give solid 3-pyridiniummethyl - 7 - [α-amino-α-(2'-thienyl)acetamido] decephalosporanic acid inner salt. By concentrating the methanol triturate at 30° C. in vacuo and then pouring the concentrate so obtained into a large volume of acetone there is precipitated an additional amount of this product.

EXAMPLE 5

Substitution of an equal volume of α-picoline, γ-picoline and 2,4-lutidine, respectively, for pyridine in the procedure of Example 4 produces:

3 - α - picoliniummethyl-7-[α-amino-α-(2'-thienyl)acetamido]decephalosporanic acid inner salt,
3 - γ - picoliniummethyl-7-[α-amino-α-(2'-thienyl)acetamido]decephalosporanic acid inner salt, and
3 - 2',4' - lutidiniummethyl - 7-[α-amino-α-(2'-thienyl)acetamido]decephalosporanic acid inner salt, respectively.

EXAMPLE 6

The product of Example 2 is dissolved in water and treated with acetylesterase obtained from orange peels according to the procedure of Jansen et al., Arch. Biochem. 15, 415 (1947) at pH 6 for 15 hours. The resulting solution is passed through a column containing a weak, anionic ion exchange resin (e.g., "Amberlite IR 4B") in the acetate form and the column is then eluted with aqueous acetic acid which has been adjusted to pH 5.5 with pyridine. The eluate is adjusted to pH 8 by the addition of sodium hydroxide and is then evaporated in vacuo to give 3-hynroxymethyr-7-[α-amino-α-(2-thienyr) acetamido]decephalosporanic acid in the form of its sodium salt.

EXAMPLE 7

When in Example 2 the 7-aminocephalosporanic acid is replaced by an equimolar amount of 3-methyl-7-aminodecephalosporanic acid there is obtained the sodium salt of 3-methyl-7-[α-amino-α-(2-thienyl)acetamido]decephalosporanic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound of the formula

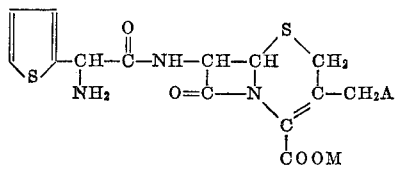

wherein A is hydrogen, hydroxyl, (lower)alkanoyloxy, benzoyloxy, a quaternary ammonium radical or, when taken together with M, a monovalent carbon-oxygen bond; and
M is hydrogen, a pharmaceutically acceptable nontoxic cation, an anionic charge when A is a quaternary ammonium radical, or, when taken together with A, a monovalent carbon-oxygen bond.

2. A compound of claim 1 having the formula

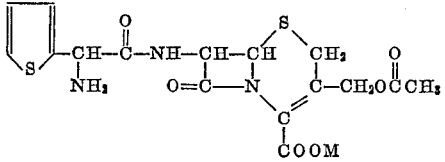

wherein M is a nontoxic, pharmaceutically acceptable cation.

3. A compound of claim 1 having the formula

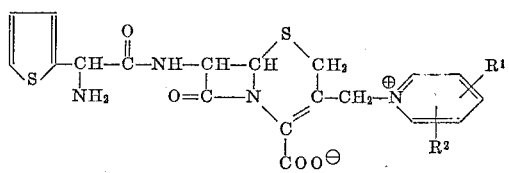

wherein $R^1$ and $R^2$ are each hydrogen or methyl.

4. The compound of claim 3 wherein $R^1$ and $R^2$ are each hydrogen.

5. A compound of the formula

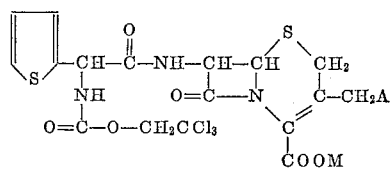

wherein A is hydrogen, hydroxyl, (lower)alkanoyloxy, benzoyloxy, a quaternary ammonium radical or, when taken together with M, a monovalent carbon-oxygen bond; and
M is hydrogen, a pharmaceutically acceptable nontoxic cation, an anionic charge when A is a quaternary ammonium radical or, when taken together with A, a monovalent carbon-oxygen bond.

6. A compound of claim 5 having the formula

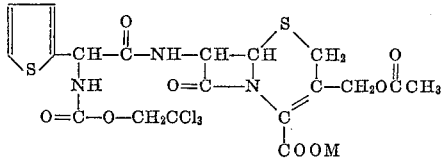

wherein M is a nontoxic, pharmaceutically acceptable cation.

7. A compound of the formula

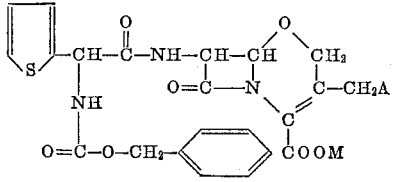

wherein A is hydrogen, hydroxyl, (lower)alkanoyloxy, benzoyloxy, a quaternary ammonium radical or, when taken together with M, a monovalent carbon-oxygen bond; and
M is hydrogen, a pharmaceutically acceptable nontoxic cation, an anionic charge when A is a quaternary ammonium radical or, when taken together with A, a monovalent carbon-oxygen bond.

8. A compound of claim 7 having the formula

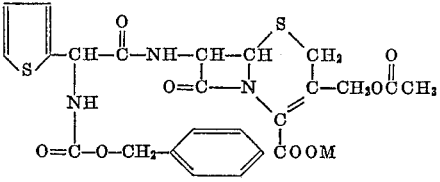

wherein M is a nontoxic, pharmaceutically acceptable cation.

No references cited.

NICHOLAS S. RIZZO, *Primary Examiner.*